(12) United States Patent
Pai et al.

(10) Patent No.: US 10,382,502 B2
(45) Date of Patent: Aug. 13, 2019

(54) CHANGE COMMENTS FOR SYNCHRONIZED CONTENT ITEMS

(71) Applicant: Dropbox, Inc., San Francisco, CA (US)

(72) Inventors: Anvisha Hrishikesh Pai, San Francisco, CA (US); Michael Wu, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 442 days.

(21) Appl. No.: 15/261,835

(22) Filed: Sep. 9, 2016

(65) Prior Publication Data

US 2017/0289210 A1    Oct. 5, 2017

Related U.S. Application Data

(60) Provisional application No. 62/318,089, filed on Apr. 4, 2016.

(51) Int. Cl.
*H04L 29/06* (2006.01)
*H04L 29/08* (2006.01)
(Continued)

(52) U.S. Cl.
CPC ........ *H04L 65/403* (2013.01); *G06F 17/2288* (2013.01); *G06F 17/241* (2013.01);
(Continued)

(58) Field of Classification Search
CPC ... H04L 65/403; H04L 67/26; H04L 67/1095; H04L 51/16; H04L 43/106; G06F 17/24; G06F 17/2288
See application file for complete search history.

(56) References Cited

U.S. PATENT DOCUMENTS 6,065,026 A * 5/2000 Cornelia ................. G06F 17/24
                                                        715/202
7,089,307 B2   8/2006 Zintel et al.
(Continued)

FOREIGN PATENT DOCUMENTS

WO    WO 2011/109416    9/2011

OTHER PUBLICATIONS

"Operational Transformation," Wikipedia, Last Modified Oct. 28, 2013, 8 pages, [Online] [Retrieved on Jan. 6, 2014] Retrieved from the Internet<URL:http://en.wikipedia.org/wiki/Operational_transforma- tion>.
(Continued)

*Primary Examiner* — William L Bashore
*Assistant Examiner* — Gregory A Distefano
(74) *Attorney, Agent, or Firm* — Fenwick & West LLP

(57) ABSTRACT

Described embodiments enable device users sharing content items via a content management system to view and modify content items within native applications on their client devices. In various embodiments, a client application detects a save operation on a content item and prompts a user to provide a comment based on changes to the content item. User comments and metadata are provided to a content management system to create a historical log that provides a comprehensive summary of user interactions with a content item, including comments regarding content item changes, version information, and timestamps. The content management system provides the comments and other log contents to client applications associated with other users sharing the content item. The client applications use the comments and log information to provide notifications to the users regarding content item changes and comments by sharing users.

17 Claims, 14 Drawing Sheets

(51) Int. Cl.
*H04L 12/58* (2006.01)
*G06F 17/22* (2006.01)
*G06F 17/24* (2006.01)
*H04L 12/18* (2006.01)

(52) U.S. Cl.
CPC .......... *H04L 51/16* (2013.01); *H04L 65/4015* (2013.01); *H04L 65/4023* (2013.01); *H04L 67/1095* (2013.01); *H04L 67/26* (2013.01); *H04L 12/1895* (2013.01)

(56) References Cited

U.S. PATENT DOCUMENTS

| | | |
|---|---|---|
| 7,401,104 B2 | 7/2008 | Shah et al. |
| 7,533,134 B2 | 5/2009 | Terry et al. |
| 7,620,659 B2 | 11/2009 | Novik et al. |
| 7,822,711 B1 | 10/2010 | Ranade |
| 7,912,916 B2 | 3/2011 | Rakowski et al. |
| 8,019,877 B2 | 9/2011 | Li et al. |
| 8,086,698 B2 | 12/2011 | Rakowski et al. |
| 8,156,078 B2 | 4/2012 | Tsinman et al. |
| 8,386,558 B2 | 2/2013 | Schleifer et al. |
| 8,468,132 B1 | 6/2013 | O'Neill et al. |
| 8,495,015 B2 | 7/2013 | Freedman |
| 8,635,209 B2 | 1/2014 | Freedman |
| 8,719,225 B1 | 5/2014 | Rath |
| 8,843,441 B1 | 9/2014 | Rath et al. |
| 8,930,312 B1 | 1/2015 | Rath et al. |
| 9,053,165 B2 | 6/2015 | Van Rossum |
| 2003/0112273 A1* | 6/2003 | Hadfield ................ G06Q 10/10 715/751 |
| 2004/0024795 A1 | 2/2004 | Hind et al. |
| 2004/0058710 A1 | 3/2004 | Timmins et al. |
| 2005/0022210 A1 | 1/2005 | Zintel et al. |
| 2005/0044187 A1 | 2/2005 | Jhaveri et al. |
| 2005/0223047 A1 | 10/2005 | Shah et al. |
| 2006/0101064 A1 | 5/2006 | Strong et al. |
| 2006/0288053 A1 | 12/2006 | Holt et al. |
| 2007/0027853 A1 | 2/2007 | Hajela et al. |
| 2007/0271502 A1* | 11/2007 | Bedi ................ G06F 17/248 715/230 |
| 2008/0222296 A1 | 9/2008 | Lippincott et al. |
| 2009/0006498 A1 | 1/2009 | Freedman |
| 2009/0113412 A1 | 4/2009 | Shribman et al. |
| 2009/0249224 A1* | 10/2009 | Davis ................ G06Q 10/10 715/753 |
| 2009/0271696 A1 | 10/2009 | Bailor et al. |
| 2009/0292709 A1 | 11/2009 | Tsinman et al. |
| 2009/0313311 A1 | 12/2009 | Hoffmann et al. |
| 2009/0327358 A1 | 12/2009 | Lukiyanov et al. |
| 2010/0138387 A1 | 6/2010 | Simelius |
| 2010/0191884 A1 | 7/2010 | Holenstein et al. |
| 2011/0106880 A1 | 5/2011 | Strong et al. |
| 2011/0113092 A1 | 5/2011 | Rakowski et al. |
| 2011/0208805 A1 | 8/2011 | Kasetty et al. |
| 2011/0296042 A1 | 12/2011 | Li et al. |
| 2012/0005159 A1 | 1/2012 | Wang et al. |
| 2012/0089710 A1 | 4/2012 | Rakowski et al. |
| 2012/0130953 A1 | 5/2012 | Hind et al. |
| 2012/0151495 A1 | 6/2012 | Burckhardt et al. |
| 2012/0185434 A1 | 7/2012 | Giampaolo et al. |
| 2012/0317239 A1* | 12/2012 | Mulder ................ G06Q 10/101 709/219 |
| 2013/0006947 A1 | 1/2013 | Akinyemi et al. |
| 2013/0124978 A1* | 5/2013 | Horns ................ G06F 17/241 715/243 |
| 2013/0151596 A1 | 6/2013 | Strong et al. |
| 2013/0191451 A1 | 7/2013 | Tse et al. |
| 2013/0204841 A1 | 8/2013 | Obusek |
| 2013/0212480 A1 | 8/2013 | Ben-Shaul et al. |
| 2013/0282656 A1 | 10/2013 | O'Neill et al. |
| 2014/0040202 A1 | 2/2014 | Hagan et al. |
| 2014/0250064 A1 | 9/2014 | Hopmann et al. |
| 2014/0280377 A1* | 9/2014 | Frew ................ G06F 17/241 707/805 |
| 2015/0370769 A1* | 12/2015 | Pereira Filho .......... G06F 17/21 726/28 |

OTHER PUBLICATIONS

"Concurrent Versions System," Wikipedia, Jun. 20, 2013, 9 pages, [Online] [Retrieved on Sep. 23, 2014] Retrieved from the Internet<URL:http://en.wikipedia.org/w/index.php?title=Concurrent_Versions_System& oldid=560712674>.

PCT International Search Report and Written Opinion, PCT Application No. PCT/US2014/045631, dated Oct. 6, 2014, 14 pages.

"Rsync," Wikipedia, Jun. 26, 2013, 8 pages, [Online] [Retrieved in Sep. 23, 2014] Retrieved from the. Internet<URL:http://en.wikipedia.org/w/index.php?title=Rsync&oldid=561- 668126>.

* cited by examiner

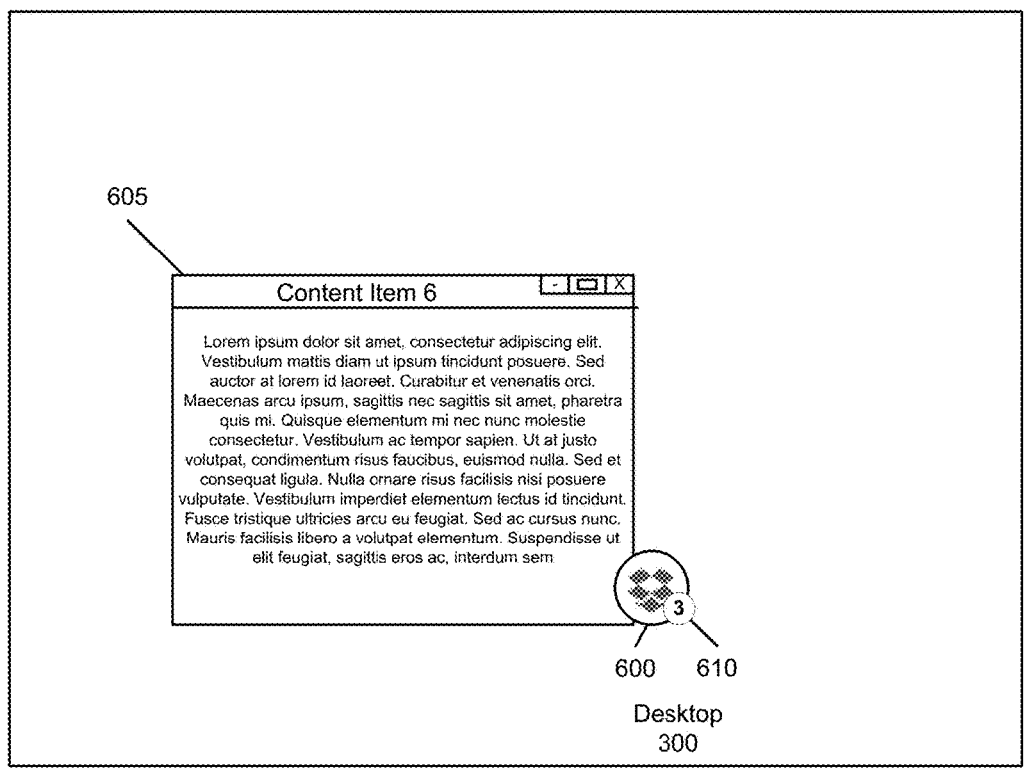

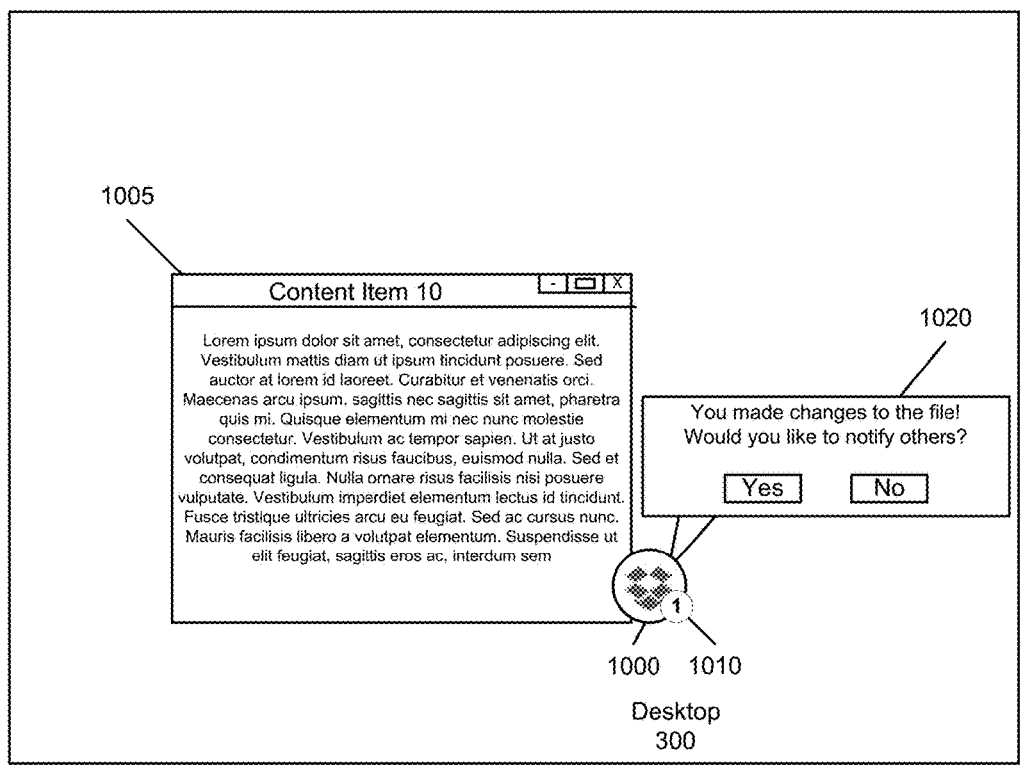

CHANGE COMMENTS FOR SYNCHRONIZED CONTENT ITEMS

CROSS REFERENCE TO RELATED APPLICATIONS

This application claims the benefit of priority under 35 U.S.C. § 119(e) to U.S. Provisional Patent Application No. 62/318,089, filed on Apr. 4, 2016 and entitled "Change Comments for Synchronized Content Items," which is incorporated herein by reference in its entirety for all purposes.

BACKGROUND

This disclosure relates generally to sharing information among devices, and particularly to interactions between native software applications and shared content.

Content management systems permit devices to synchronize content items with the content management system and other devices. A device stores a local copy of content items. When content items are added, deleted, and edited on a device, these modifications are sent to the content management system for storage and synchronization with other devices. To interact with a content item, users typically execute a native application on the device to view and modify the content item. When multiple users interact with a content item, they often communicate about the content item using other applications such as email. This type of communication provides an incomplete picture of interactions with the content item and relies on users to log and track interactions with the content item. Users lack a convenient way to communicate about a content item and view interactions with the content item, which adds inconvenience and complexity to situations in which multiple users are interacting with a content item.

SUMMARY

Described embodiments enable device users sharing content items via a content management system to view and modify content items within native applications on their client devices. In various embodiments, a client application detects a save operation on a content item and prompts a user to provide a comment based on changes to the content item. User comments and metadata are provided to a content management system to create a historical log that provides a comprehensive summary of user interactions with a content item, including comments regarding content item changes, version information, and timestamps. The content management system provides the comments and other log contents to client applications associated with other users sharing the content item. The client applications use the comments and log information to provide notifications to the users regarding content item changes and comments by sharing users.

A device in accordance with various embodiments stores a local copy of a shared content item, which is maintained and synchronized between devices by a content management system. The device includes a native application that can be used to access the content item, such as a word processor, media viewer, media editor, and so forth. The native application displays the content item in a user interface element, such as a window. The device also includes a client application, in addition to the native application, which monitors interactions with the content item and communicates information about those interactions to other devices sharing the content item either directly or via the content management system.

Interaction information includes interactions by users with the client application and interactions by users with the native application. Interaction information may be determined from interaction events, such as messages, notes, collaboration requests, and presence events. Presence events are programmatic events that occur in the native application. Presence events include opening a content item, editing a content item, saving a content item, renaming a content item, moving a content item, and deleting a content item.

Additional types of interaction information that may be received by the client application include notes, comments, messages, notification requests, and collaboration requests related to the content item. Interaction information also includes metadata modifications, such as versioning notes, or requests for further information stored at the content management system about the content item, such as a request to view versioning information or prior content item versions. The interaction information is exchanged by the devices and provided to the content management system to provide users with information regarding others' interactions with the content item.

BRIEF DESCRIPTION OF THE DRAWINGS

FIGS. 6A-6D show example user interfaces displaying interaction information.

FIG. 10A shows an example user interface for prompting a user to notify other sharing users by providing a comment on a content item change.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
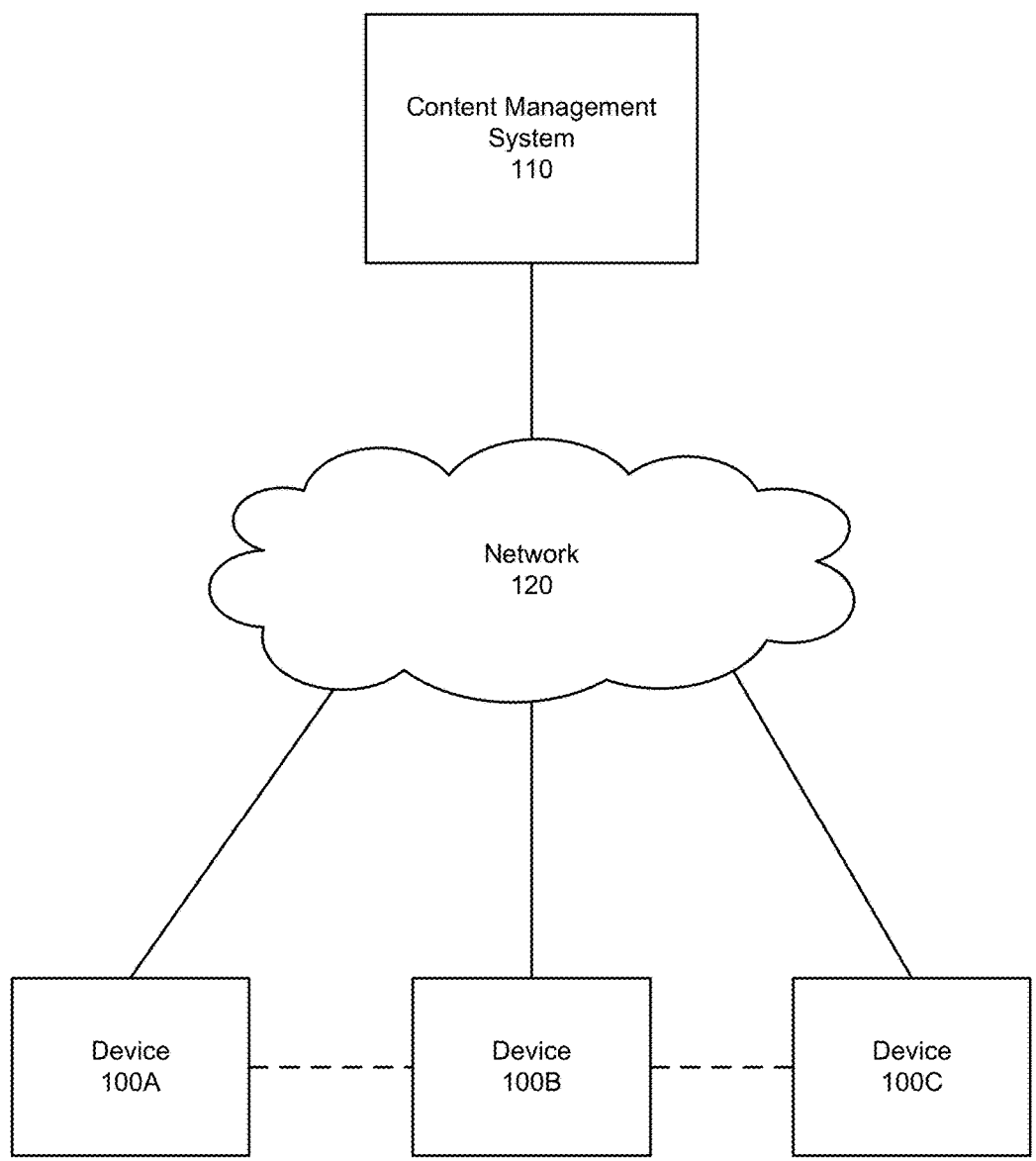
FIG. 1 shows an embodiment of an environment for content item synchronization including communication of interaction information and user collaboration

FIG. 1 shows an embodiment of an environment for content item synchronization including communication of interaction information. FIG. 1 includes devices 100A, 100B, 100C (referred to generally as device 100), content management system 110, and network 120. Three devices are shown only for purpose of illustration; in practice any number of devices may be present in the environment. Similarly, other modules or components described and illustrated throughout may include single or multiple instances as appropriate to the needs of the implementer and without loss of generality.

Device 100 may be any suitable computing device for locally storing and viewing content items and synchronizing the content items with content management system 110. Examples of devices include desktop and laptop computers, hand-held mobile devices, tablet computers, and other computing devices. The operation of device 100 in various embodiments is further described below.

Each device 100 communicates with content management system 110 through network 120. Network 120 is any suitable network and may include local networks, corporate networks, global networks, and any combination of these. In typical configurations, devices 100 communicate via a wired or wireless communication network to a local network service provider, and communicate with content management system 110 through the Internet. In certain configurations, devices 100A, 100B, and 100C communicate directly with one another without network 120 as indicated in FIG. 1 by dashed lines. For example, devices 100 may communicate via a wired or wireless connection, such as wirelessly via a Bluetooth connection or a wired connection via a Universal Serial Bus (USB).

Content management system 110 provides content sharing and synchronization services for users of devices 100. These services allow users to share content with users of other devices 100. In addition to content sharing, content management system 110 updates shared content responsive to changes and enables synchronized changes to content items across multiple devices 100. A user may synchronize content across multiple devices 100 owned by the user and associated with the user's account, and the user may share content that is synchronized with devices associated with other users' accounts. Content stored by content management system 110 can include any type of data, such as digital data, documents, media (e.g., images, photos, videos, audio, streaming content), data files and databases, source and object code, recordings, and any other type of data or file, collectively referred to here as "content items." Content items stored by content management system 110 may also be used to organize other content items, such as folders, tables, collections, albums, playlists, or in other database structures (e.g., object oriented, key/value etc.). In practice, various devices 100 may be synchronizing different groups of content items, based on user associations, permissions, content sharing permissions, and so forth. The operation of content management system 110 in various embodiments is further described below with respect to FIG. 4.

Figure 2:
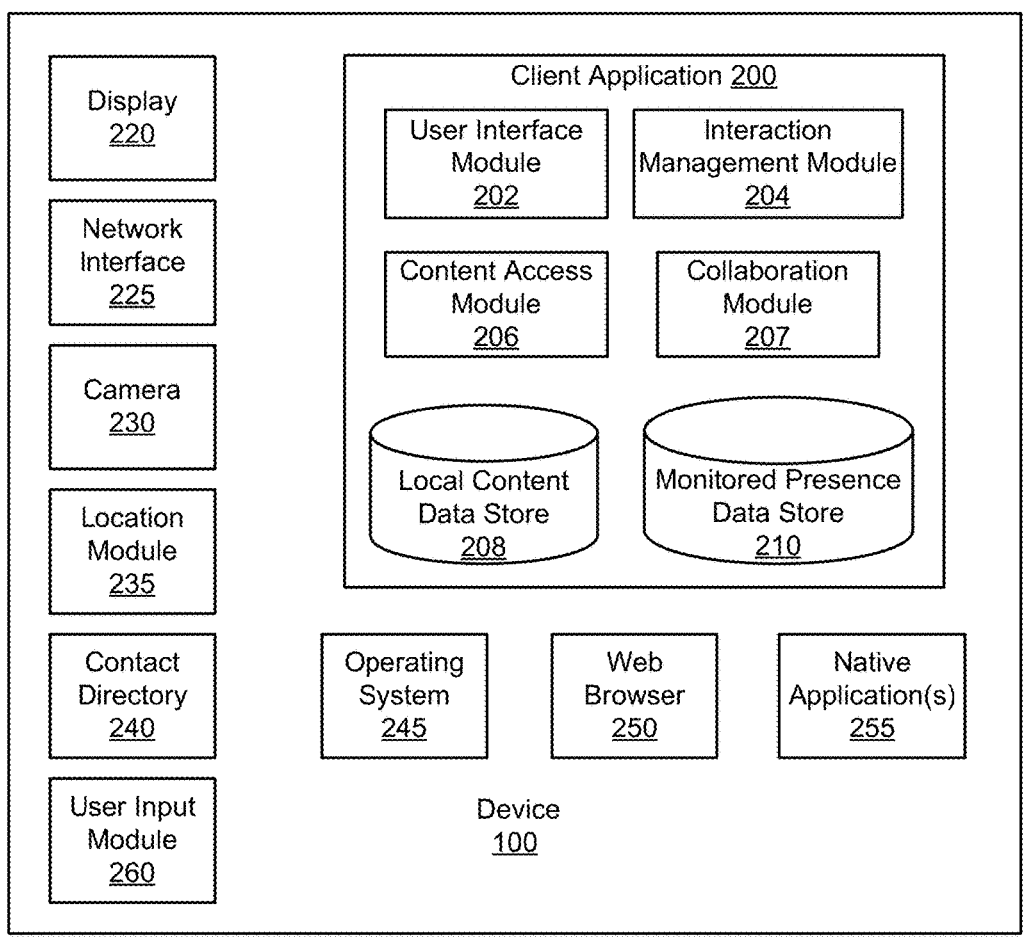
FIG. 2 shows various modules and components of a device in accordance with one embodiment.

FIG. 2 shows various modules and components of device 100 in accordance with one embodiment. Device 100 includes display 220 for providing information to the user, and in certain client devices 100 includes a touchscreen. Device 100 also includes network interface 225 for communicating with content management system 110 via network 120. Device 100 also includes a user input module 260, which receives user inputs from various user input devices, such as a keyboard, a mouse, a trackpad, or other device. Other conventional components of a client device 100 that are not material are not shown, for example one or more computer processors, local fixed memory (RAM and ROM), as well as optionally removable memory (e.g., SD-card), power sources, and audio-video outputs.

Software modules include operating system 245 and one or more native applications 255. Native applications 255 vary based on the client device, and may include various applications for creating, viewing, consuming, and modifying content stored on content management system 110, such as word processors, spreadsheets, database management systems, code editors, image and video editors, e-book readers, audio and video players, and the like. Operating system 245 on each device provides a local file management system and executes the various software modules such as content management system client application 200 and native application 255. A contact directory 240 stores information about the user's contacts, such as name, picture, telephone numbers, company, email addresses, physical address, website URLs, and the like. Further operation of native applications 255, operating system 245, and content management system client application 200 are described below.

In certain embodiments, device 100 includes additional components such as camera 230 and location module 235. Camera 230 may be used to capture images or video for upload to the online content management system 110. Location module 235 determines the location of device 100, using for example a global positioning satellite signal, cellular tower triangulation, or other methods. Location module 235 may be used by client application 200 to obtain location data and add the location data to metadata about a content item, such as an image captured by camera 230.

Client device 100 accesses content management system 110 in a variety of ways. Client application 200 can be a dedicated application or module that provides access to the services of content management system 110, providing both user access to shared files through a user interface, as well as programmatic access for other applications. Client device 100 may also access content management system 110 through web browser 250. As an alternative, client application 200 may integrate access to content management system 110 with the local file management system provided by operating system 245. When access to content management system 110 is integrated in the local file management system, a file organization scheme maintained at content management system 110 is represented as a local file structure by operating system 245 in conjunction with client application 200. Client application 200 may take various forms, such as a stand-alone application, an application plug-in, or a browser extension. Client application 200 includes user interface module 202, interaction management module 204, content access module 206, local content data store 208, monitored presence data store 210, and collaboration module 207.

In addition to handling other device tasks, operating system 245 displays information from applications executing on device 100 to a user via display 220, which may include one or more user interface elements. Such user interface elements may vary based on the particular device and configuration. User interface elements include windows on a desktop interface as well as interface elements on a mobile device. Examples of operating systems that employ user interface elements such as windows are Microsoft Windows 10 by Microsoft Corporation of Redmond, Wash., and OS X by Apple Inc. of Cupertino, Calif. In addition, operating system 245 manages control of multiple native applications 255, which may be executing simultaneously. The user interface elements may be layered, such that one layer overlaps another layer. In some operating systems and configurations, only a single user interface element is displayed at a given time. One user interface element is typically the active user interface element, meaning that it is the user interface element to which the operating system 245 routes user inputs, such as keyboard entry, cursor movement, touch sensors, touch gestures, and so forth. As understood by those of skill in the art, a window or other user interface element that is active at a particular time is often said to have focus. Users may select another user interface element to change the focus from one user interface element to another, and in some instances operating system 245 may change the focus without user input.

Typically, the user interface elements, e.g., windows, associated with native applications 255 are managed by operating system 245, which maintains an association between process identifiers of executing native applications 255 and user interface element identifiers of the user interface elements. For example, a particular application may be associated with process id "2587", which may be managing multiple user interface elements, with user interface element identifiers 4, 8, and 10. Each user interface element identifier may be separately associated with a particular content item opened by that native application 255, and multiple user interface element identifiers and process identifiers may be associated with the same content item.

Operating system 245 also handles and recognizes various events. Such events include a request from native applications 255 to close or open a content item, a request from native applications 255 to close a window or other user interface element, and requests to change a user interface element focus, among many others. As described below, these events may be used by interaction management module 204 to recognize a change in presence related to a content item.

Client application 200 identifies interactions that take place with respect to a content item, such as when a user opens, closes, edits, or saves the content item on the device. These interactions are identified by client application 200 to generate interaction information describing the interaction with the content item. Interaction information includes interactions with client application 200 and interactions with native application 255. Interaction information determined from actions performed within native applications 255 is termed presence information. An application, such as client application 200 that determines interaction information and presence information is termed a presence application. Additional types of interaction information (in addition to presence information) include notes, messages, and notification requests related to the content item, which may be received by client application 200. Messages may include chat messages to other devices, messages indicating a user's intent to interact with (e.g., to edit) a content item, and messages indicating a user's intent to begin a collaboration session. Notification requests may include a request to be notified when another user's interaction information changes. Interaction information also includes metadata modifications, such as versioning notes, event timestamps, or requests for further information stored at content management system 110 about the content item, such as a request to view versioning information or prior content item versions. Further examples of interaction information are described below. Client application 200 may receive chat or intent information from a user. In various embodiments, device 100 identifies a user's presence in a content item (i.e. that the user has the content item open or is editing the content item using the native application 255) through interaction with operating system 245 as described further below. Interaction information is transmitted to other devices 100 that are synchronized with respect to the content item.

Device 100 receives content items from content management system 110 and permits users to view, modify, and interact with the content items using various native applications 255 stored on the device 100. For example, device 100 may include a photo editing application that manipulates image content items, a word processing application that permits modification of text content items, or a computer-aided design (CAD) application that permits modification of drawing content items. As described further below, interaction information is determined by device 100 via user interactions applications and the interaction information is sent to other devices 100. In addition, when device 100 receives interaction information relating to other devices 100, the device 100 displays that interaction information.

In one embodiment, an application detecting interaction information relating to content items is distinct from the applications viewing or manipulating the content items. For example, the client application detecting interaction information is distinct from a photo editing application manipulating or displaying the image content items. In various embodiments, the application detecting interaction information is also responsible for synchronizing the content items with content management system 110. Since the application detecting presence information may be distinct from the applications about which presence is detected, presence may be monitored for many applications and content items at once and without requiring integration of the presence monitoring into each type of content item viewer. That is, no special presence monitoring add-on or application modification is required, for example, for each of a photo editing application, a word processing application, and a playlist editing application.

Figure 3A:
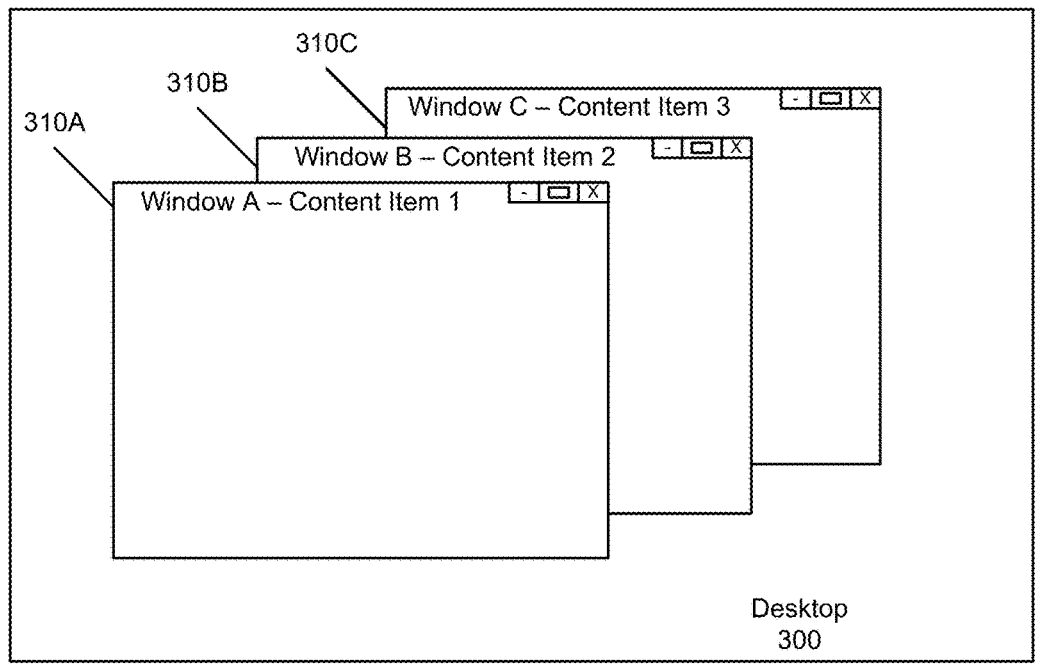
FIGS. 3A and 3B show a user interface element focus change on a desktop display of a device.
Figure 3B:
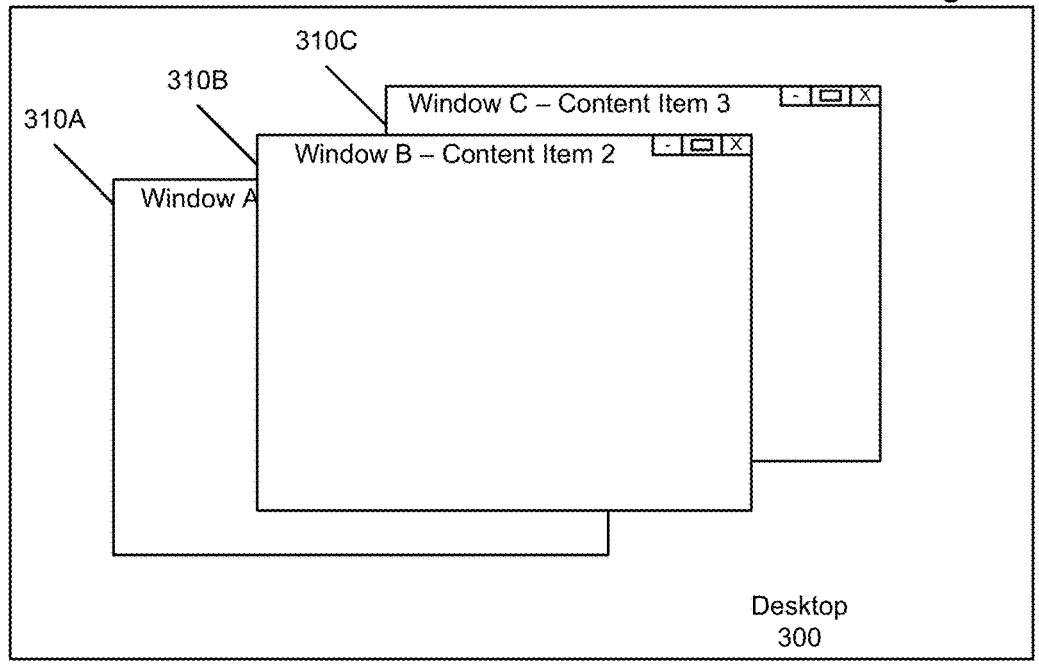

FIGS. 3A and 3B show an example of a user interface element focus change on desktop 300 shown on display 220 of device 100. In FIG. 3A, windows 310A, 310B, and 310C are displayed on desktop 300 and viewable by the user. In this embodiment, desktop 300 is a general container or frame maintained by operating system 245 that encloses user interface elements on display 220. In FIGS. 3A and 3B, the user interface elements are windows 310 in a desktop computing environment. In other configurations, such as a mobile device, or other display with limited area, only a single user interface element might be displayed at a time. As shown by FIG. 3A, window 310A is the active window, shown as the front window, partially obscuring windows 310B and 310C. In FIG. 3B, focus changed to window 310B, which is now the front window and the active window. The focus may change due to user interaction with window 310B, or due to a process requesting that its window become the active window. In certain operating systems and configurations, a user interface element has focus (e.g., is receiving user input) without being the front user interface element.

Referring again to FIG. 2, to open a content item, native application 255 requests the content item from operating system 245 and receives a handle to the content item from operating system 245 for the content item. In some cases, application 245 does not maintain the handle, and may load the content item data into memory and subsequently close the content item handle even if native application 255 continues to use data from the content item or if the user enters edits to the content item. Accordingly, open content item handles are often not a reliable way to determine whether an application is interacting with a particular content item. As such, in certain embodiments, further behaviors exhibited by the native applications 255 are used to determine whether an application is editing a content item.

Native applications 255 also perform various behaviors when a user modifies a content item, and prior to the user saving the content item. These behaviors vary based on the application and operating system 245. For example, some native applications 255 create a temporary content item with a filename that differs from the open content item, for example leading the temporary content item's filename with a tilde or other recognizable mark. In other examples, the native applications 255 changes the title of a user interface element associated with the content item, which may or may not be directly viewable by a user. In still further examples, native application 255 sets a flag indicating the content item has been modified. Native application 255 may also provide information regarding content item modification in response to a request from another application or the operating system. For example the Accessibility API in the OS X operating system as described above provides information regarding content items associated with a user interface element. Since an open content item handle may not reliably determine whether a content item is being edited by a native application 255, these behaviors are used by presence management module 204 to determine presence relating to editing or modifying a content item as described further below.

Native applications 255 may typically be executed on device 100 independently from one another, and may permit communication between the applications and other applications or processes executing on device 100. Native applications 255 typically provide information to processes using application programming interfaces (APIs), which permit applications to request information from the executing process. For example, native applications 255 may present an API permitting a request for user interface elements controlled by the application, or to indicate the title of a user interface element, or to request a path in a file system associated with a content item opened by the native application 255. Similarly, operating system 245 may provide similar APIs to requesting processes, such as requesting information about a process that controls a particular user interface element.

Client application 200 manages access to content management system 110. Client application 200 includes user interface module 202 that generates an interface to the content accessed by client application 200, as variously illustrated herein, and is one means for performing this function. The generated interface is provided to the user by display 220. Client application 200 may store content accessed from a content storage at content management system 110 in local content data store 208. While represented here as within client application 200, local content data store 208 may be stored with other data for client device 100 in non-volatile storage. When local content data store 208 is stored this way, the content is available to the user and other applications or modules, such as native application 255, when client application 200 is not in communication with content management system 110. Content access module 206 manages updates to local content data store 208 and uses synchronization logic to communicate with content management system 110 to synchronize content modified by client device 100 with content maintained on content management system 110. One example of such synchronization is provided in U.S. Pat. No. 9,053,165, filed Sep. 27, 2013, which is hereby incorporated by reference in its entirety. Client application 200 may take various forms, such as a stand-alone application, an application plug-in, or a browser extension.

Content management system 110 may provide additional data for synchronizing content items, such as information designating that a content item has been deleted, or that the device 100 may be viewing or editing an outdated version of a content item.

Interaction management module 204 obtains and manages interaction information relating to a user's synchronized content items. As described above, the interaction management module 204 is typically a distinct module from the native applications 255 being monitored by interaction management module 204 for presence information and executes as a separate process. Interaction management module 204 detects interaction events occurring on device 100 for synchronized content items. Interaction management module 204 may detect interaction events by monitoring presence events, or by monitoring received user inputs such as comments and messages. Interaction events indicate that a user has interacted with a content item. Interactions include viewing the content item, editing the content item, saving the content item, commenting on the comment item, sending a message related to the content item, and collaborating in the content item. Interaction management module 204 sends notifications about interaction events and other interaction information to content management system 110.

In one embodiment, interaction management module 204 instructs user interface module 202 to prompt a user for interaction information. For example, interaction management module 204 may detect a save of a content item on a device 100 and instruct user interface module 202 to prompt the user of the device to comment on changes to the content item associated with the save action. Interaction management module 204 may store this information in monitored presence data store 210 or send it to content management system 110. In one embodiment, interaction management module receives and maintains prompt conditions specifying when users should be prompted for change comments. For example, prompt conditions may specify that a user should only be prompted for change comments if a change is significant (e.g., at least a minimum proportion of the data has been changed, if a change is the first change for a content item, or if a change is the first change by a particular user. Prompt conditions may be specified by users or other implementers of content item synchronization. Interaction management module 204 determines whether prompt conditions have been met by analyzing changes to content items. Change comments are discussed in more detail below with respect to FIGS. 9 and 10A-B.

Interaction management module 204 also receives interaction information, including user notification queues, relating to other users' interactions with content items from content management system 110 for display to the user. In one embodiment the interaction management module 204 displays interaction information from user notification queues by attaching an interaction indicator to a user interface element associated with a synchronized content item. In various embodiments, the interaction indicator and associated user interface elements display real-time interaction information, such as presence information, and interaction information relating to past activities. This allows users to view the content item and associated interaction information simultaneously, which provides a more holistic view of a content item, users associated with the content item, and changes made to the content item.

In one embodiment, the interaction management module 204 provides received notification queue content and other interaction information for display in chronological order so that users may view a sequence of interactions with the content item. Displayed interaction information may include metadata such as timestamps, user identifiers, user photos, and other data. In another embodiment, the interaction module displays interaction information as it is received in a notification channel style. When a new piece of interaction information is received via the user interface, from another device 100, or from the content management system 110, it is added to the channel, and users may be notified by the interaction indicator, another user interface element, or by some other method. Displaying interaction information, including notifications, is discussed in more detail below with respect to FIGS. 6A-6D.

In one embodiment, the interaction management module 204 detects when a user has been provided with a notification about interaction information or has viewed interaction information displayed in the user interface. The interaction management module 204 may send this information to the content management system 110 and/or other devices 100 associated with the user and the content management system 110 so that the interaction information that has been viewed by a user is tracked across multiple devices 100. Using this information, the interaction management module 204 or the content management system 110 can determine whether a user has viewed interaction information, or been provided with a notification about the interaction information and avoid duplicating notifications so that users are not notified about the same interactions on several devices.

To determine many types of interaction information, interaction management module 204 receives interaction information through user interface elements, as further described below. To determine presence information related to a synchronized content item, interaction management module 204 monitors user interface elements associated with native applications 255. Interaction management module 204 can monitor all user interface elements, or alternatively monitor just certain user interface elements after the user interface element is associated with a content item. Monitored presence data store 210 includes information maintained by interaction management module 204 to indicate that particular user interface elements are monitored to determine actions relating to a synchronized content item.

While shown here as a part of client application 200, in various implementations content access module 206 and interaction management module 204 are separated into distinct modules for performing their respective functions. Similarly, various modules and data stores are described separately throughout this disclosure for convenience and in various implementations may be combined or further separated into separate components as desired.

Figure 4:
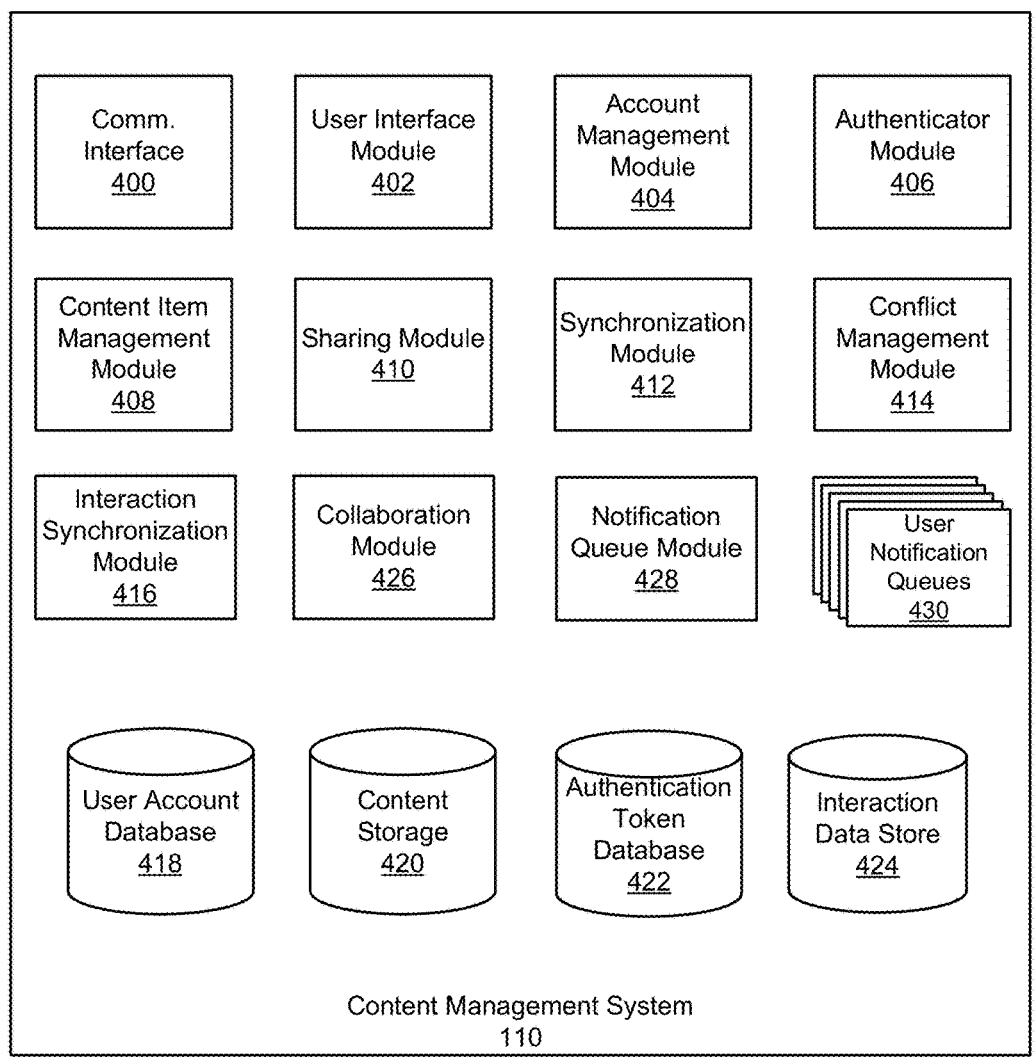
FIG. 4 shows components of a content management system, according to one embodiment.

FIG. 4 shows components of content management system 110 of FIG. 1, according to one embodiment. When using content management system 110, to facilitate the various content management services a user can create an account with content management system 110. In one embodiment, the user's account information is maintained in user account database 418. User account database 418 can store profile information for registered users. In some cases, the only personal information in the user profile is a username and/or email address. However, content management system 110 can also be configured to accept additional user information, such as password recovery information, demographics information, payment information, and other details of interest to the implementer. Each user is associated with an identifier, such as a userID or a user name.

User account database 418 can also include account management information, such as account type, e.g., free or paid; usage information for each user, e.g., file edit history; maximum storage space authorized; storage space used; content storage locations; security settings; personal configuration settings; content sharing data; etc. Account management module 404 can be configured to update and/or obtain user account details in user account database 418. Account management module 404 can be configured to interact with any number of other modules in content management system 110.

An account can be associated with multiple devices 100, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users may be different for a shared folder. In one embodiment, the account is a namespace that may be associated with several users, each of whom may be associated with permissions to interact with the namespace.

In one embodiment, the content is stored in content storage 420. Content storage 420 can be a storage device, multiple storage devices, or a server. Alternatively, content storage 420 can be a cloud storage provider or network storage accessible via one or more communications networks. In one configuration, content management system 110 stores the content items in the same organizational structure as they appear on the device. However, content management system 110 can store the content items in its own order, arrangement, or hierarchy.

Content storage 420 can also store metadata describing content items, content item types, and the relationship of content items to various accounts, folders, or groups. The metadata for a content item can be stored as part of the content item or can be stored separately. In one configuration, each content item stored in content storage 420 can be assigned a system-wide unique identifier.

Content storage 420 can decrease the amount of storage space required by identifying duplicate content items or duplicate segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 420 stores content items using a version control mechanism that tracks changes to content items, different versions of content items (such as a diverging version tree), and a change history. The change history includes a set of changes that, when applied to the original content item version, produces the changed content item version.

In one embodiment, content management system 110 automatically synchronizes content items from one or more devices using synchronization module 412. The synchronization is platform-agnostic. That is, the content items are synchronized across multiple devices 100 of varying type, capabilities, operating systems, etc. For example, client application 200 synchronizes, via synchronization module 412 at content management system 110, content in the file system of device 100 with the content items in an associated user account on system 110. Client application 200 synchronizes any changes to content items in a designated folder and its sub-folders with the synchronization module 412. Such changes include new, deleted, modified, copied, or moved files or folders. Synchronization module 412 also provides any changes to content associated with device 100 to client application 200. This synchronizes the local content at device 100 with the content items at content management system 110.

Conflict management module 414 determines whether there are any discrepancies between versions of a content item located at different devices 100. For example, when a content item is modified at one device and a second device, differing versions of the content item may exist at each device. Synchronization module 412 determines such versioning conflicts, for example by identifying the modification time of the content item modifications. Conflict management module 414 resolves the conflict between versions by any suitable means, such as by merging the versions, or by notifying the device of the later-submitted version.

A user can also view or manipulate content via a web interface generated by user interface module 402. For example, the user can navigate in web browser 250 to a web address provided by content management system 110. Changes or updates to content in content storage 420 made through the web interface, such as uploading a new version of a file, are synchronized back to other devices 100 associated with the user's account. Multiple devices 100 may be associated with a single account and files in the account are synchronized between each of the multiple devices 100.

Content management system 110 includes communications interface 400 for interfacing with various devices 100, and with other content and/or service providers via an Application Programming Interface (API), which is one means for performing this function. Certain software applications access content storage 420 via an API on behalf of a user. For example, a software package, such as an app on a smartphone or tablet computing device, can programmatically make calls directly to content management system 110, when a user provides credentials, to read, write, create, delete, share, or otherwise manipulate content. Similarly, the API can allow users to access all or part of content storage 420 through a web site.

Content management system 110 can also include authenticator module 406, which verifies user credentials, security tokens, API calls, specific devices, etc., to determine whether access to requested content items is authorized, and is one means for performing this function. Authenticator module 406 can generate one-time use authentication tokens for a user account. Authenticator module 406 assigns an expiration period or date to each authentication token. In addition to sending the authentication tokens to requesting devices, authenticator module 406 can store generated authentication tokens in authentication token database 422. Upon receiving a request to validate an authentication token, authenticator module 406 checks authentication token database 422 for a matching authentication token assigned to the user. Once the authenticator module 406 identifies a matching authentication token, authenticator module 406 determines if the matching authentication token is still valid. For example, authenticator module 406 verifies that the authentication token has not expired or was not marked as used or invalid. After validating an authentication token, authenticator module 406 may invalidate the matching authentication token, such as a single-use token. For example, authenticator module 406 can mark the matching authentication token as used or invalid, or delete the matching authentication token from authentication token database 422.

Content management system 110 includes a sharing module 410 for sharing content publicly or privately. Sharing content publicly can include making the content item accessible from any computing device in network communication with content management system 110. Sharing content privately can include linking a content item in content storage 420 with two or more user accounts so that each user account has access to the content item. The content can also be shared across varying types of user accounts.

In some embodiments, content management system 110 includes a content management module 408 for maintaining a content directory that identifies the location of each content item in content storage 420, and allows client applications to request access to content items in the storage 420, and which is one means for performing this function. A content entry in the content directory can also include a content pointer that identifies the location of the content item in content storage 420. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 410 adds a user account identifier to the content entry associated with the content item, thus granting the added user account access to the content item. Sharing module 410 can also be configured to remove user account identifiers from a content entry to restrict a user account's access to the content item.

To share content publicly, sharing module 410 generates a custom network address, such as a URL, which allows any web browser to access the content in content management system 110 without any authentication. The sharing module 410 includes content identification data in the generated URL, which can later be used by content management system 110 to properly identify and return the requested content item. For example, sharing module 410 can be configured to include the user account identifier and the content path in the generated URL. The content identification data included in the URL can be transmitted to content management system 110 by a device to access the content item. In addition to generating the URL, sharing module 410 can also be configured to record that a URL to the content item has been created. In some embodiments, the content entry associated with a content item can include a URL flag indicating whether a URL to the content item has been created.

Interaction synchronization module 416 receives presence information from a device, stores it as part of a presence record in interaction data store 424 and determines a user presence with respect to a content item. Each user may be associated with a user presence describing presence records associated with that user with respect to a content item, which may be without reference to any particular user device, process, or user interface element. While presence information may describe presence with respect to a particular user interface element or process, this presence associated with a user is termed a user presence. Example user presence includes collaborating, editing, viewing, open, and not present. In this example, a "collaborating" user presence indicates the content item is associated with a user interface element that is presented for viewing and modification on two or more devices, an "editing" user presence indicates the content item is associated with a user interface element that has modified the content item, a "viewing" user presence indicates the content item is associated with an active user interface element on a device 100, while an "open" user presence indicates a user interface element is associated with the content item and has opened the content item, but has not yet closed the content item. Various embodiments may use more or fewer user presences. For example, one embodiment includes only "editing" "viewing" and "not present," in which case user interface elements that have opened the content item but are not the active user interface element may be treated as viewing or not presence, according to the configuration of the system. Obtaining and tracking presence information is also further described in U.S. patent application Ser. No. 14/635,192, incorporated by reference herein.

Interaction synchronization module 416 manages synchronization of interaction information across devices 100. Devices 100 provide interaction information to interaction synchronization module 416. Interaction synchronization module 416 stores interaction information in interaction data store 424. Interaction synchronization module 416 sends interaction information about synchronized content items to synchronized devices 100 for display to users. Interaction synchronization module 416 may further send instructions to notify users of new or unviewed interaction information. In one embodiment, devices 100 send viewing information to interaction synchronization module 416 indicating whether and when users have viewed interaction information. Viewing information is stored in interaction data store 424. In another embodiment, viewing information indicates whether and when users have interacted with interaction information. Interaction synchronization module 416 may use this information to avoid duplicate notifications on multiple devices 100 associated with the same user. For example, if a user is notified of new interaction information on a first device 100 and views the interaction information, this event will be stored such that the user will not be notified about the same interaction information on a second device 100.

In one embodiment, interaction information stored in interaction data store 424 is accessible by client application 200 so that users may view and interact with stored interaction information related to a content item. Stored interaction information may include metadata such as interaction event timestamps and version information. Version information associates interaction events with different versions of a content item. In one embodiment, stored interaction information is provided to users of devices 100 as a content item history log, in which interaction information and metadata is displayed chronologically. In this way, users may easily view interaction information in one place and better understand the context of changes, edits, views and comments to a content item. For example, a user may see that a content item was edited at 3:00 PM, and the editing user provided the comments "changed the conclusion paragraph" at 3:01 PM. This gives users a comprehensive view of the entire editing process in one place.

In one embodiment, content management system 110 includes collaboration module 426. Collaboration module 426 can be configured to facilitate collaboration between devices 100. For instance, collaboration module 426 may initiate a device handshake by sharing a device's address with another device so that collaboration may occur. Further, collaboration module 426 may be configured to perform any of the tasks that are performed by collaboration module 207 of a device 100 or by any other module of client application 200.

Notification queue module 428 creates and manages user notification queues 430 for shared content items. User notification queues 430 are stored at content management system 110 and sent to devices 100. A user notification queue 430 is a group of one or more interactions with a shared content item that may be presented to a user to indicate recent interactions with the shared content item by sharing users. In one embodiment, each sharing user associated with a content item has a user notification queue 430 corresponding to that content item. Different users' user notification queues for a particular content item may differ.

In one embodiment, notification queue module 428 receives a notification of an interaction event, and determines interactions that are candidates to be added to user notification queues 430. The notification queue module 428 modifies user notification queues 430 corresponding to a shared content item. Modifying user notification queues 430 may include adding candidate interactions to the notification queue and removing interactions already present in the notification queue. When an interaction event corresponding to a shared content item is received by the content management system 110, the notification queue module 420 determines whether to add interactions to and/or remove interactions from the sharing users' user notification queues 430. Types of interactions added to a user notification queue 430 may include content item views, content item edits, content item collaborations, content item comments, and content item messages.

In one embodiment, interactions have an associated interaction priority. An interaction priority specifies a relative priority of an interaction type to other interaction types. For example, a content item edit may have a higher priority than a content item view. Interaction priorities may be specified by an implementer of the content management system 110 or by a user of the content management system 110. The notification queue module 428 determines the interaction types and interaction priorities for candidate interactions and interactions in user notification queues 430. In various embodiments, the notification queue module 428 selects higher priority interactions to add to user notification queues 430 and lower priority interactions to remove from user notification queues 430. For example, the notification queue module 428 may compare the priority of a candidate interaction by a user A to the priority of interactions by user A already present in a notification queue 430. If the candidate interaction is a lower priority interaction than an interaction in the user notification queue 430, the candidate interaction is not added to the queue. If the candidate interaction is a higher priority interaction than an interaction in the user notification queue 430, the candidate interaction is added to the queue, and the interaction already in the queue may be removed from the queue. This allows users to be presented other users' higher priority interactions with a content item, which provides important information for the users without also providing less important information that may confuse the user or waste space in a user interface element.

Notification queue module 428 may send user notification queues 430 to devices 100. In one embodiment, notification queue module 428 sends a user notification queue 430 responsive to receiving a notification that a user has accessed a content item. The access notification may come directly from device 100 or from interaction synchronization module 416. The access notification may be generated responsive to detecting a presence event consistent with access of the content item, such as opening a content item for viewing or editing. In one embodiment, notification queue module 428 clears a user notification queue 430 responsive to receiving a notification that the associated user viewed the notification queue. This way, the user will not be presented with notifications that the user has already viewed.

Content management system 110 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1 G or more of main memory, as well as 500 Gb to 2 Tb of computer readable, persistent storage, and running an operating system such as LINUX or variants thereof. The operations of content management system 110 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of content management system 110 are sufficiently complex as to require implementation on a computer system, and cannot be performed in the human mind simply by mental steps.

In one configuration, components described below with reference to content management system 110 are incorporated into devices 100 that share and synchronize content items without management by content management system 110. These devices 100 may synchronize content and share interaction information over network 120 or via a direct connection as described above. In this configuration, devices 100 may incorporate functionality of synchronization module 412, conflict management module 414, interaction synchronization module 416, and other modules and data stores for incorporating functionality described below as provided by content management system 110. Accordingly, devices 100 in this configuration operate in a peer-to-peer configuration and may do so without content management system 110 or network 120.

Figure 5:
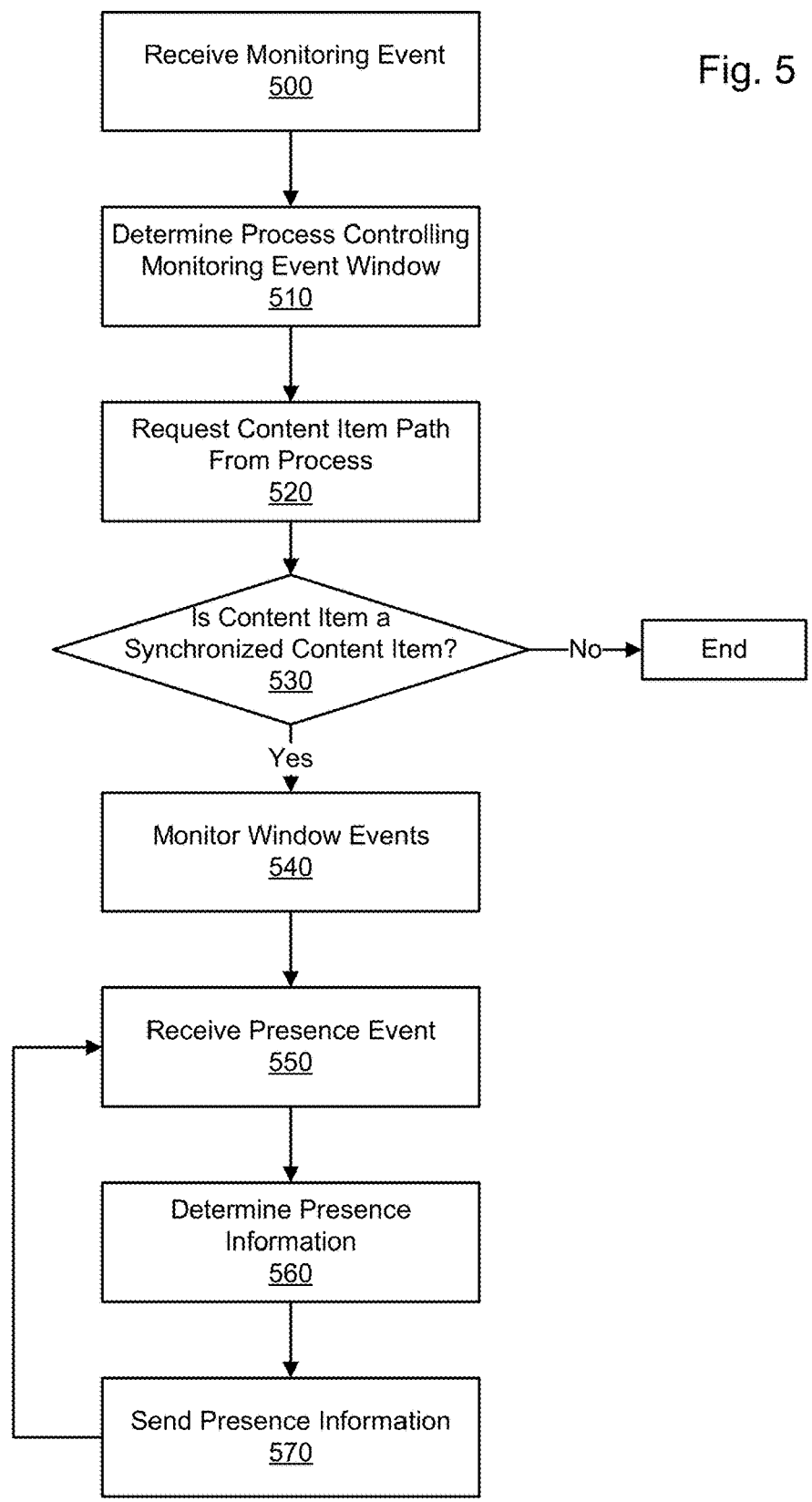
FIG. 5 shows an example process for determining presence information associated with a content item according to one embodiment.

FIG. 5 shows an example process for determining presence information associated with a content item according to one embodiment. This process is typically performed by interaction management module 204. Where the user interface elements are monitored only after being associated with a content item, interaction management module 204 uses events indicating that a content item is being opened by an application or user interface element to determine whether to monitor a user interface element. This is one example of an event that may associate a content item with a user interface element to initiate monitoring of the user interface element, termed a monitoring event. In other embodiments, a selection of user interface elements to monitor is determined in another way, or all user interface elements are monitored, in which case the interaction management module 204 may not use monitoring events. In another embodiment, the monitoring event includes a process saving a content item.

If enabled by operating system 245, the interaction management module 204 may register with operating system 245 to receive monitoring events for specific applications. In these embodiments, operating system 245 notifies interaction management module 204 when a request to open or save a content item is received by operating system 245. In this embodiment, interaction management module 204 receives 500 a monitoring event that indicates a window or other user interface element is interacting with a content item, which may be a synchronized content item (i.e., the process is interacting with the content item in a particular user interface element). The monitoring event designates at least a user interface element that triggered the monitoring event. In other embodiments, interaction management module 204 monitors events associated with user interface elements from time-to-time (e.g., five minute intervals) and queries whether the user interface elements are associated with any open content items. According to operating system 245 and native application 255 configuration, this query may be directed to operating system 245 or native application 255. When a user interface element is associated with a newly opened content item, that newly opened content item is treated as a monitoring event to determine whether the newly opened content item is a content item synchronized with content management system 110 and that presence information should be determined for the newly opened content item.

When the monitoring event is received, interaction management module 204 determines 510 which process is responsible for the user interface element associated with the monitoring event. Interaction management module 204 typically determines the process by requesting the process ID associated with the user interface element from operating system 245. In some embodiments, the interaction management module 204 identifies a process by requesting an identification of the process from the user interface element itself.

To confirm that the process and user interface element are correctly associated with one another and that the user interface element is still active, interaction management module 204 may also request from the process the identity of the currently active user interface element. The interaction management module 204 confirms that the currently active user interface element received from the process matches the user interface element associated with the monitoring event.

Using the process identifier, interaction management module 204 requests 520 any open content item from the process to obtain an associated directory path for the content item. The interaction management module 204 may designate the user interface element associated with the monitoring event with the request for the open content item's path. The interaction management module 204 requests the open item from the process or operating system using an interface available interface to the process or operating system. As one example, in the OS X operating system, the accessibility API may be used to access information relating to a content item and content item path for a user interface element, as known in the art. Using the content item path provided by the process, the interaction management module 204 determines whether the opened content item path corresponds to any synchronized content items. If so, interaction management module 204 determines that the content item accessed by the process is a content item synchronized to content management system 110 and associates that process and user interface element with the content item. In other embodiments, other methods may be used to determine whether a content item accessed by the process is a synchronized content item.

If the content item is synchronized 530 to content management system 110, interaction management module 204 stores information relating to the content item, process, and user interface element, to monitor 540 the user interface element for events. When the content item associated with the monitoring event is not synchronized, the process may end or may continue by displaying a synchronization interface to a user. Monitoring information is stored in monitored presence data store 210. To monitor and subsequently receive presence events related to the user interface element, interaction management module 204 registers to receive events associated with the user interface element. The registration process by the interaction management module 204 varies according to the configuration of device 100. Typically the interaction management module 204 registers a request to receive presence events from operating system 245 or from the applicable process or user interface element. While the monitoring events determine whether a user interface element or process is associated with a synchronized content item, presence events are events that may indicate a change in state of a user's presence relating to the user interface element or process associated with a content item. Example presence events include a change in focus of a user interface element, closing a user interface element, closing a content item, opening a content item, and so forth based on the types of presence recognized by the interaction management module 204. In various configurations, the presence events used by interaction management module 204 depend on the events operating system 245 and native application 255 make available for receipt by interaction management module 204.

The presence events are used to determine presence information associated with the content item to which the presence event relates. For example, a presence event indicating that a user interface element that is associated with a content item has the focus will indicate that the user is viewing the content item, and hence the presence information for that content item indicates that state. Likewise, a presence event indicating that a user interface element unrelated to a content item has gained focus indicates that the content item associated with a previously focused user interface element has lost focus, and thus indicates that user is no longer be viewing the content item. Thus, presence information provides a level of semantic interpretation of the underlying presence event itself.

In addition to receiving presence events that the interaction management module 204 registered for, presence events may also be initiated by interaction management module 204 to confirm that presence information has not changed for a monitored user interface element. These presence events may be initiated if a threshold amount of time passed since the last presence event for a particular user interface element or process, or at particular intervals, e.g., every five minutes.

In addition to registering for presence events, interaction management module 204 may receive interaction events in other ways. In one embodiment, users may expressly indicate interaction information through a user interface element. The user interface element can be configured to allow the user to indicate, for example, that a user intends to revise a content item, to indicate that intent to other users who are editing or viewing the content item, for example by selection of a menu item or icon that represents the particular intent. The user interface element can also be configured to allow a user to indicate other intentions of the user, such as a user's intention to no longer view a content item, or to expressly indicate that a user is not or will not be present for a content item. Other users may use such "not present" intention to know that the content item is free for editing. User input interaction events may also include messages or chat features to be disseminated to other users associated with the content item, for example, to transmit a message to other users currently viewing the content item on other devices.

When a presence event is received 550, interaction management module 204 determines 560 whether any presence information has changed since the last presence event related to a monitored user interface element. For user-initiated interaction information, the interaction information may be the information provided by the user, for example the user's selection of a user interface element indicating that the user intends to modify a content item, or a user's chat message. For presence events, the interaction management module 204 queries the monitored process to determine the status of the monitored user interface element. In particular, the interaction management module 204 queries the process to determine if the monitored user interface element is the active user interface element. When the monitored user interface element is the active user interface element, the content item is being viewed by the user.

In some embodiments, in addition to detecting user presence with respect to a content item, interaction management module 204 also determines whether the content item is being or has been modified by the user. This further aspect enables presence information to be reported more granularly, for example with an indication that a user has a presence with respect to the content item as an editor rather than as a viewer. As the particular actions performed by applications when a content item is being modified may vary as described above, detecting one of these actions by interaction management module 204 indicates that the process has edited the content item. For example, according to the type of actions expected by the process when the content item is edited, interaction management module 204 may query the process to determine if the process indicates the content item has been flagged as modified, if the title information of the user interface element has changed, if a temporary file has been saved or cached, or any other data that suggests the content item has been modified. Interaction management module 204 may also query the operating system to determine if a content item has been saved that matches a temporary content item format, for example a content item with a filename similar to the content item, but with a tilde or other specialized variation of the filename. Such modifications indicate that the presence information associated with the content item should reflect that the user is editing the content item.

After determining 560 the presence information, any new presence information for a user interface element may be stored as monitored presence data store 250. This presence information in one embodiment is stored on a user interface element-by-user interface element basis, such that multiple user interface elements by one process may be associated with the same content item, and have presence information individually managed. In one embodiment, presence information may change based on the current presence status. For example, when the presence information for a content item reflects that the content item is being edited, in one embodiment the presence for the content item in a user interface element is not changed when a user changes focus to another user interface element. Instead, the edited status is maintained with respect to that user interface element until a presence event indicates the user interface element is closed. In another embodiment, since editing has the potential to introduce modifications to the content item, in one embodiment the presence information for an edited document is not changed until the interaction management module 204 receives a notification that modifications to the content item are either committed or the modifications are discarded.

A content item with presence information indicating it is being viewed may have that status change when the user interface element loses focus, or within a threshold period of time of losing focus. This may be the case even if the user interface element associated with the content item is still open. In one embodiment, "viewed" presence information indicates whether a content item is associated with an active user interface element. In one embodiment, "viewed" presence information is retained until the user interface element is not active (or has lost focus) for longer than a threshold amount of time. In one embodiment, the content item is considered "viewed" while the content item is open by an application.

When there is a change to the interaction information, interaction management module 204 sends 570 the presence information to content management system 110. In one embodiment, the sent presence information includes an identifier of the content item, the process id, the user interface element id, and the presence status. The presence information may further include metadata, such as versioning notes and presence event timestamps.

In one embodiment, the content management system 110 maintains received interaction information for the synchronized content item, for example in a data store of the content management system 110. The content management system 110 may provide received interaction information to other devices 100 that are synchronized with respect to the content item for display to users.

Figure 6A:
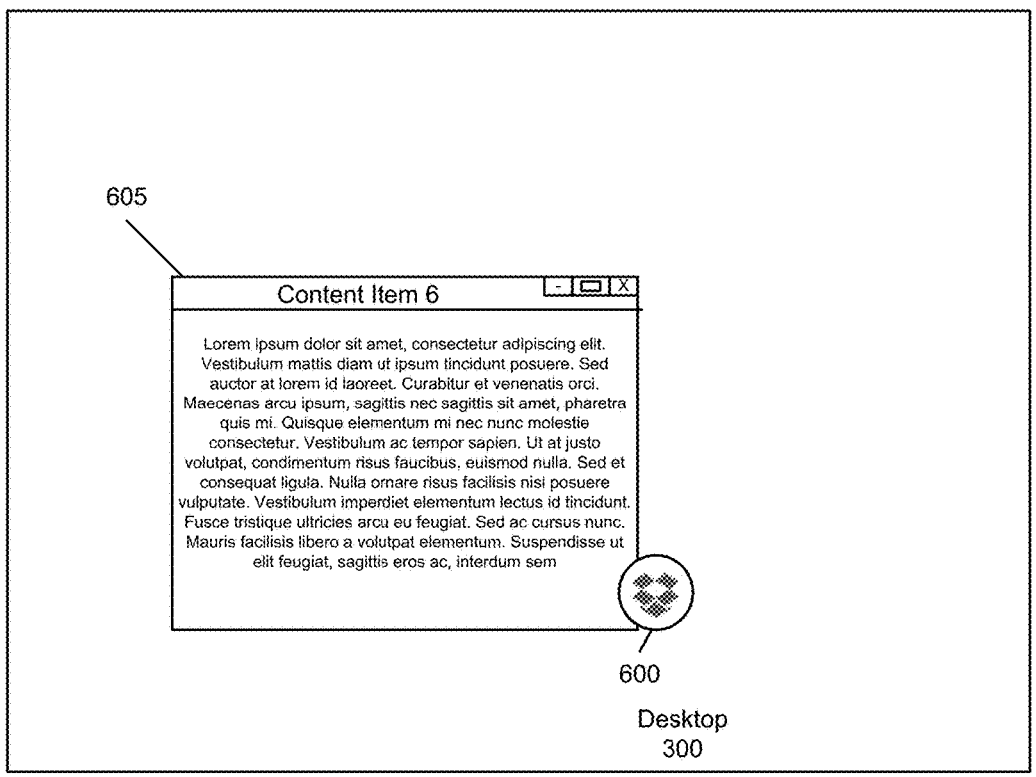

FIGS. 6A-6D show example user interfaces displaying interaction information, including user notification queue content. These user interfaces may be generated, for example, by user interface module 202, and is one means for doing so. In FIG. 6A, the example window 605 of the user interface displays a synchronized content item, here "content item 6." The example user interface displays interaction information received from content management system 110. To display interaction information, interaction management module 204 provides interaction indicator(s) 600 along a boundary or border of the window associated with the content item.

Interaction indicator 600 is displayed along with the window associated with the content item, and in one embodiment interaction management module 204 tracks the location of the window and displays interaction indicator 600 adjacent to or near the window, for example alongside a border or boundary of the window. The interaction indicator 600 may be located on any convenient area of display 220. In one embodiment the interaction indicator is displayed proximal the associated user interface element of the content item so as to visually indicate to the user the relationship between the interaction indicator and the specific content item. In addition, the display of the interaction indicator along a boundary or border of the window increases the likelihood that the user will notice interaction indicator 600. In one embodiment, the interaction indicators 600 are displayed on or alongside a vertical edge of the window containing the content item (e.g., right edge as shown FIG. 6A). Alternatively, interaction indicator 600 may be shown in a separate area of the display, such as a taskbar, or tray icon or may be a separate user interface element that does not interact with the user interface element of the content item. Though shown here as a single interaction indicator 600, any number of interaction indicators 600 may be shown related to the content item.

In FIG. 6B, the interaction indicator 600 includes a badge element 610. Badge element 610 may include a number of other visual elements to provide more information about interaction information. For example, the badge element 610 may have a number representing a number of unviewed interaction events, as illustrated in FIG. 6B. In other embodiments, the badge element 610 may be a visual element such as an icon to indicate unviewed interaction events to a user.

Figure 6C:
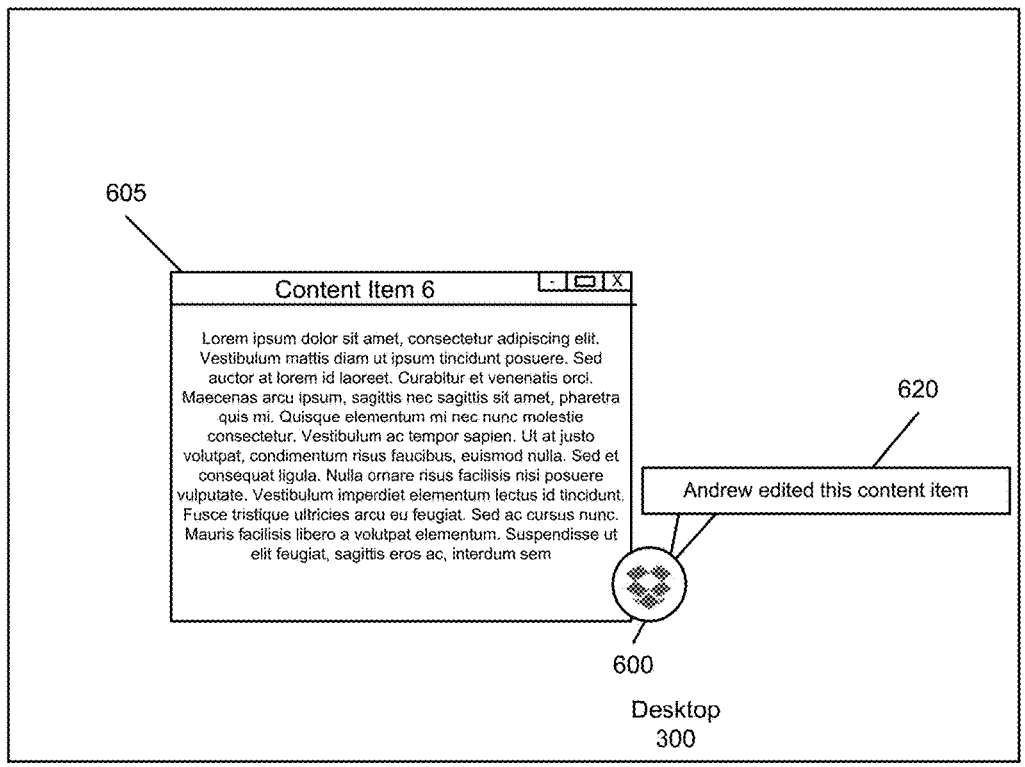

Turning to FIG. 6C, supplemental interaction indicator 620 may appear when a user selects or hovers over interaction indicator 600 to provide further information or interfaces for the user. In the example shown in FIG. 6C, supplemental interaction indicator 620 describes a recent interaction with the content item, specifically that Andrew edited content item 6. Supplemental interaction indicator 620 may also appear without action by the user, for example, when a presence changes, to indicate a new user is viewing or editing the document.

Figure 6D:
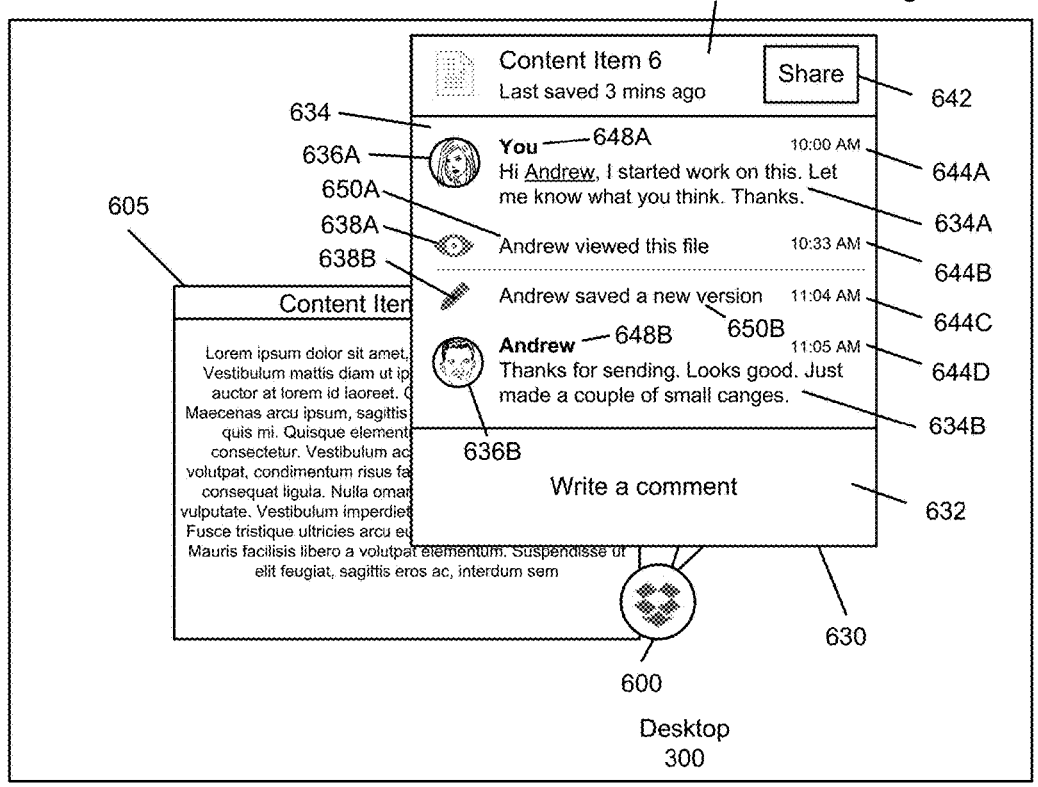

FIG. 6D shows an example user interface with an interaction element 630 through which a user may view and enter interaction information. This interface includes interaction indicators 600, in addition to further user interface elements. The interaction element 630 may be presented in lieu of the example of FIGS. 6A-6C, or may be presented as a supplemental element providing additional data regarding the content item.

The interaction element 630 includes content item information section 646, which displays the content item name, as well as the time of a last interaction event, such as a save action. In the example of FIG. 6D, the content item information section 646 indicates that Content Item 6 was last saved 3 minutes ago. The interface also includes sharing element 642 that allows users to share the content item with other users, either via synchronization or other methods known in the art.

The example interface of FIG. 6D includes interaction viewing section 634, which displays interaction information and associated information to users. Associated information may include times that interactions occurred and user information associated with interactions. In the example of FIG. 6D, interaction viewing section 634 contains messages 634A-B and presence information 650A-B. For each item of displayed interaction information, interaction viewing section 634 contains interaction times 644A-D. In one embodiment, as shown in FIG. 6D, interaction times 644A-D are expressed as a time that the interaction occurred. In another embodiment, interaction times may be expressed as a relative time, for example, how much time has elapsed since the interaction occurred.

The interaction viewing section 634 contains user images 636A-B for messages and other interaction information associated with users. User images 636A-B may be received from the content management system 110. The interaction viewing section 634 contains user identifiers 648A-B, which may be user IDs, names, or other identifiers. The interaction viewing section 634 may include other icons or graphics for interaction information. For example, icons 638A-B may correspond to displayed presence information. Icon 638A is an eye to represent viewing, and icon 638B is a pencil to represent editing or saving a new version.

In one embodiment, users may interact with (e.g., click, hover over, etc.) various elements within the interaction viewing section 634 to view additional information. For example, selecting or hovering over name elements 648A-B or user images 636A-B may allow the user to view additional user information related to that user.

This interface also provides a chat interface for users to communicate with other users associated with the content item. The chat interface permits users to enter and receive messages to other users. A text input element 632 allows users to enter messages to other users, and interaction viewing element 634 allows users to view messages. The chat interface may permit users to specifically discuss information relating to that content item, such as when a user expects to finish editing the item. These messages are received by interaction management module 204 as interaction information and sent to other clients synchronized to the content item. This permits users to chat directly about a content item, even if the native application provides no chat functionality.

Figure 7:
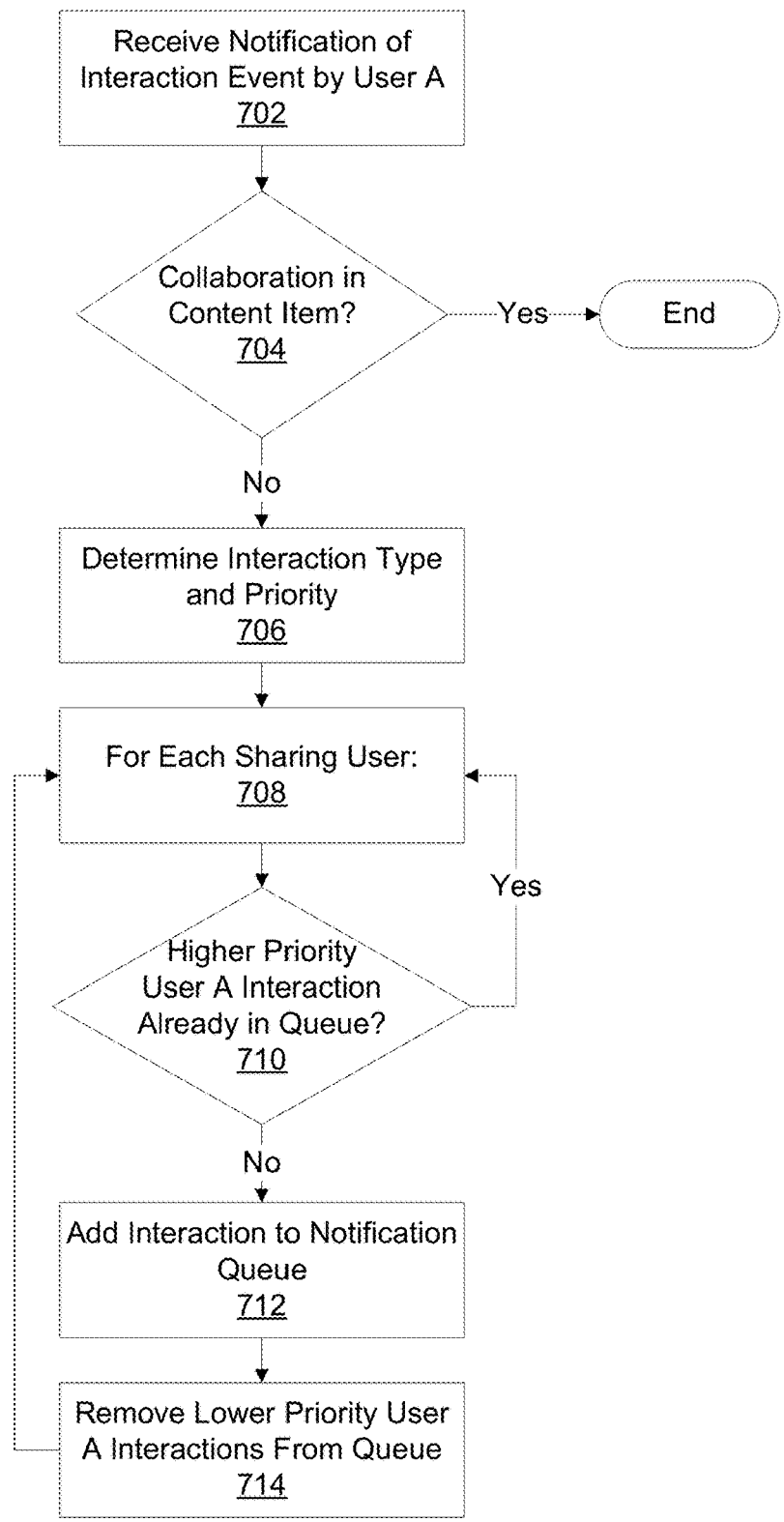
FIG. 7 shows an example process for updating notification queues for sharing users according to one embodiment.

FIG. 7 shows an example process for updating notification queues for sharing users according to one embodiment. Content management system 110 receives 702 a notification of an interaction event for a shared content item. The interaction event indicates a new interaction with the shared content item by a sharing user, which we refer to here for purposes of explanation as "User A."

In one embodiment, content management system 110 determines 704 whether users are collaborating in the content item—that is, whether more than one user currently has the document open for viewing or editing. If users are collaborating in the content item, the process ends, and the notification is not added to the users' notification queues. If users are not currently collaborating in the content item, the content management system 110 proceeds with updating the notification queues for the content item for each sharing user.

Content management system 110 determines 706 the interaction type and the priority of the new interaction. Content management system 110 uses the interaction type and the priority of the new interaction to determine whether to add the interaction to each user's notification queue for the content item. For each sharing user, content management system 110 determines 710 whether the notification queue already includes an interaction by the sharing user A with a higher priority than the priority of the new interaction. If the notification queue does already include a higher priority interaction by the sharing user A, the notification queue is not updated, and the process proceeds from step 708 with the next user. If the notification queue does not already include a higher priority interaction by the sharing user A, content management system 110 adds 712 the new interaction to the notification queue. In one embodiment, content management system 110 removes 714 lower priority interactions by the sharing user A from the notification queue.

Figure 8:
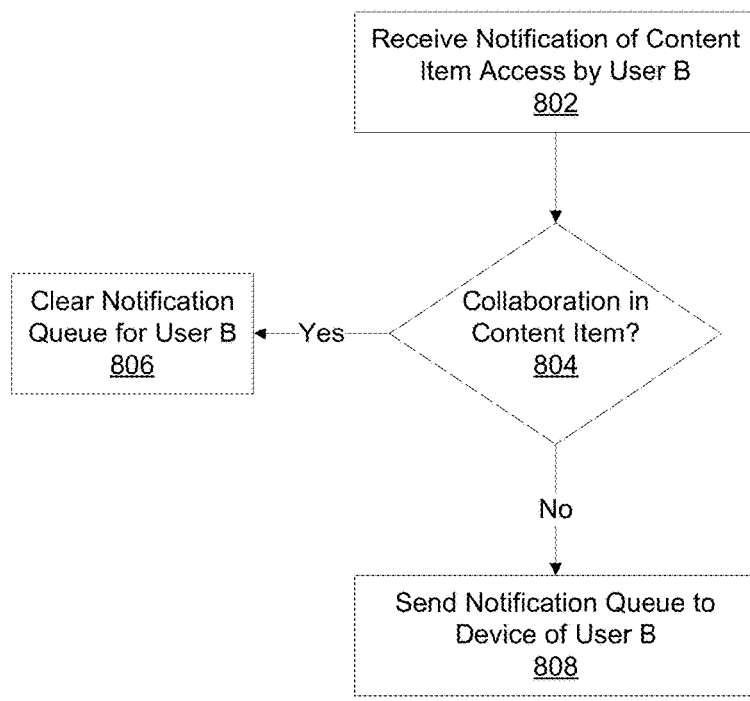
FIG. 8 shows an example process for sending a notification queue to a device accessing a content item according to one embodiment.

FIG. 8 shows an example process for sending a notification queue to a device accessing a content item according to one embodiment. Content management system 110 receives 802 a notification that a content item is accessed by sharing user B. Content management system 110 determines 804 whether the sharing user B is collaborating in the content item. If the sharing user B is collaborating in the content item, content management system 110 clears 806 the sharing user B's notification queue for the content item without delivering the queue. Alternatively, if the sharing user B is not collaborating in the content item, content management system 110 sends the sharing user B's notification queue for the content item to a device 100 of the sharing user B.

Figure 9:
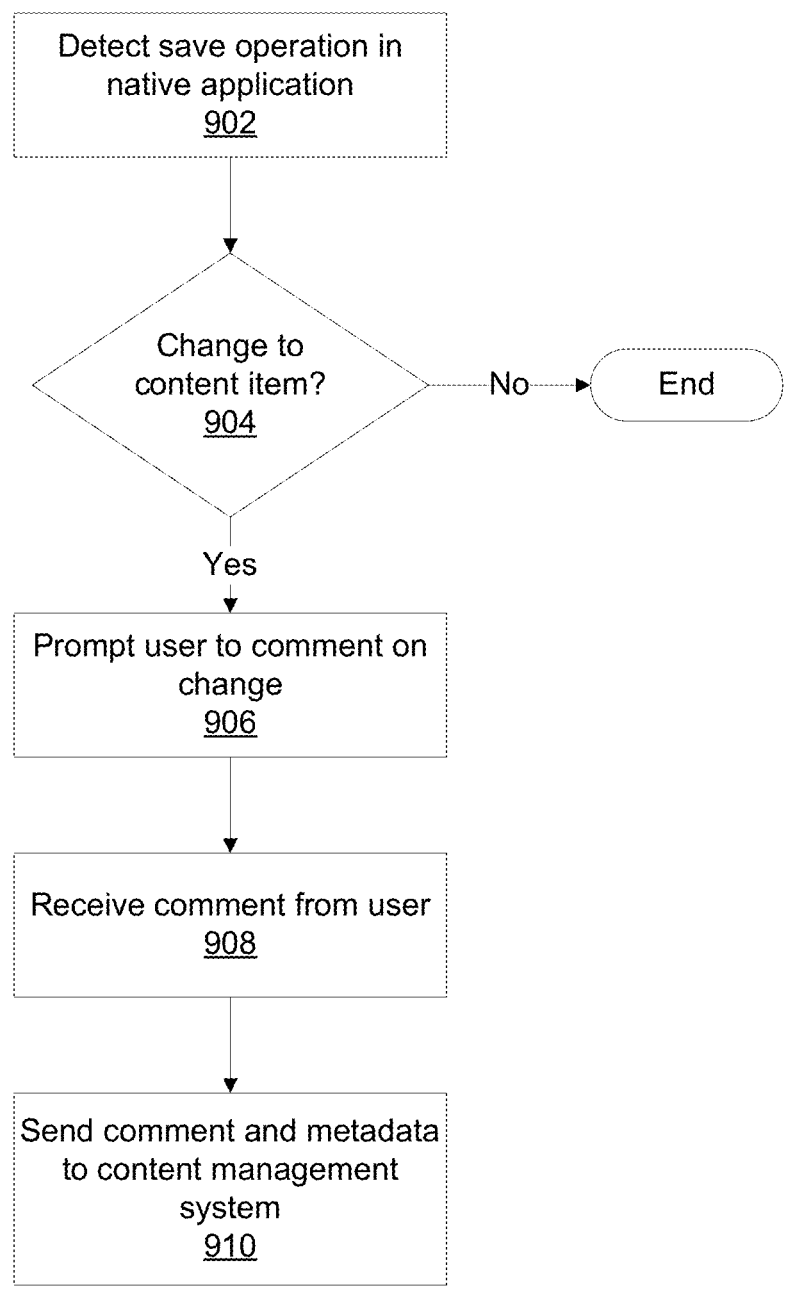
FIG. 9 shows an example process for prompting a user of a device to notify other sharing users of a change to a content item by providing a comment according to one embodiment.

FIG. 9 shows an example process for prompting a user of a device to notify other sharing users of a change to a content item by providing a comment according to one embodiment. Interaction management module 204 of device 100 detects 902 a save operation in a native application 255. The save interaction may be detected, for example, by monitoring interaction events on device 100. In one embodiment, interaction management module 204 determines 904 whether there is a change to the content item, for example by detecting an editing interaction event. If there is no change to the content item, the process ends. If there is a change to the content item, user interface module 202 prompts 906 the user to notify other sharing users of the content item by providing comment about the changes made to the content item. In one embodiment, the user is prompted by a user interface element displayed in the user interface of device 100, as described below with respect to FIGS. 10A and 10B. In one embodiment, the user is prompted according to specified prompt conditions, as discussed above with respect to FIG. 2.

FIG. 10A shows an example user interface for prompting a user to notify other sharing users by providing a comment on a content item change. The example window 1005 of native application 255 displays a synchronized content item, here "content item 10." User interface module 202 displays an interaction indicator 1000 along a boundary or border of the example window 1005 or in another suitable location in the user interface of device 100. Prompt element 1020 is displayed responsive to detecting the save operation, and prompts the user to notify other sharing users by providing a comment on the changes to the content item. In one embodiment, the interaction indicator 1000 includes a badge 1010 that indicates a number of outstanding user prompts. The user may interact with the prompt element 1020, for example by selecting the yes element or clicking the badge 1010, to be presented with a user interface element for providing comment.

Figure 10B:
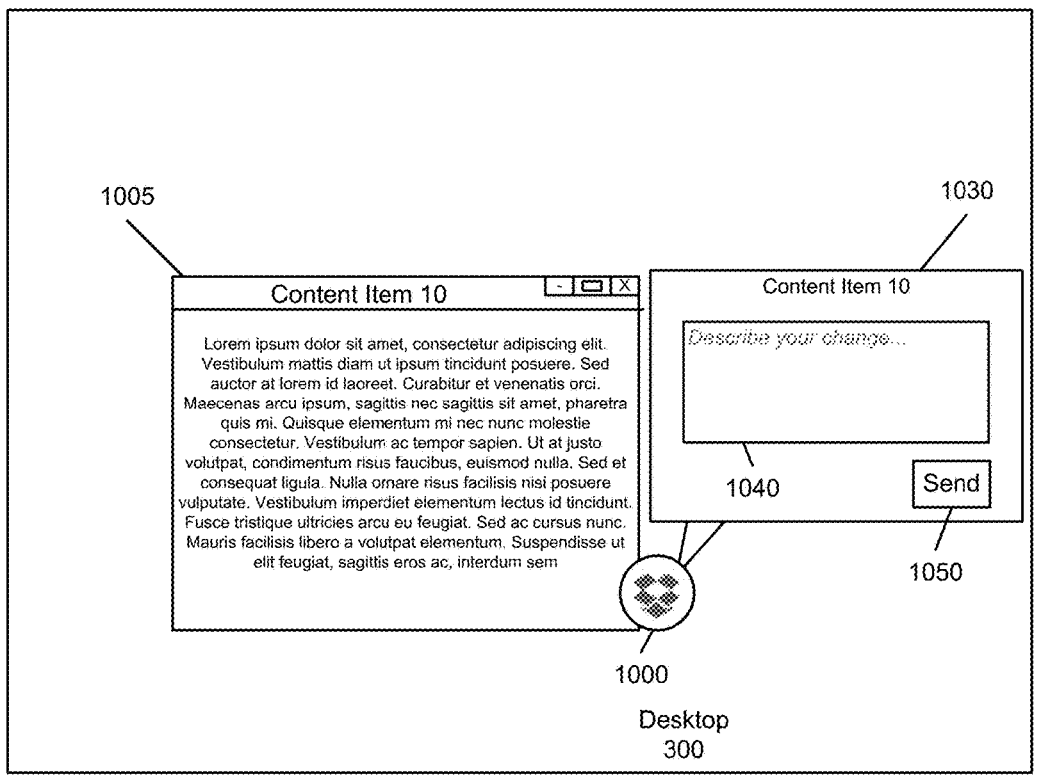
FIG. 10B shows an example user interface for providing a comment about a changed content item.

FIG. 10B shows an example user interface for providing a comment about a changed content item. Comment element 1030 includes a text input element 1040 into which a user may enter comment text, and a send element 1050 that allows a user to instruct interaction management module 204 to send the comment to content management system 110.

Returning to FIG. 9, interaction management module 204 receives 908 a comment from the user, for example, responsive to the user entering the comment in the text input element 1040 and selecting the send element 1050. Interaction management module 204 sends 910 the comment to content management system 110 for storage and distribution to devices 100 of sharing users. As described above with respect to FIG. 4, content management system 110 stores the comment along with other interaction information as part of a historical log of the content item so that users may view a comprehensive view of the editing process of the content item in one place. Interaction management module 204 may provide content item metadata, such as version information, along with the comment so that the comment may be associated with a version of the content item in the historical log.

Content management system 110 provides comments to client applications 200 of sharing users so that the sharing users can be notified of the change to the content item and the comments provided by the editing user. Notifications may be provided to users as described above with respect to FIGS. 2 and 6A-6D. In various embodiments, content management system 110 also provides other historical log contents along with comments for presentation to sharing users.

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    detecting, by a client application on a first device, a save operation on a content item synchronized between a content management system and a plurality of devices including the first device, each device associated with one of a plurality of users with which the content item is shared, and the save operation including a change to the content item;
    generating for display, by the client application in a user interface of the first device, a user interface element prompting a user of the first device to input comment data associated with the change to the content item, wherein the user interface element is displayed responsive to determining that the user should be prompted to comment based on the extent to which the content item has changed;
    receiving input comment data from the user; and
    sending the comment data and metadata related to the content item to the content management system, wherein the comment data is provided to each of the plurality of devices other than the first device to notify the users of the plurality of devices about the change to the content item.

2. The method of claim 1, wherein the content item is displayed for editing in a native application of the device and detecting the save operation comprises detecting a presence event on the device.

3. The method of claim 2, wherein displaying the user interface element comprises displaying a prompt element along a boundary or border of a window of the native application.

4. The method of claim 1, wherein the user interface element is displayed responsive to determining that the content item has changed.

5. The method of claim 1, wherein the metadata comprises version information about the content item.

6. The method of claim 1, wherein the metadata comprises a timestamp for the save operation or the comment.

7. A system comprising:
    a processor configured to execute instructions;
    a non-transitory, non-volatile storage medium containing instructions, which when executed by the processor cause the processor to perform the steps of:
        detecting, by a client application on a first device, a save operation on a content item synchronized between a content management system and a plurality of devices including the first device, each device associated with one of a plurality of users with which the content item is shared, and the save operation including a change to the content item;
        generating for display, by the client application in a user interface of the first device, a user interface element prompting a user of the first device to input comment data associated with the change to the content item, wherein the user interface element is displayed responsive to determining that the user should be prompted to comment based on the extent to which the content item has changed;
        receiving input comment data from the user; and
        sending the comment data and metadata related to the content item to the content management system, wherein the comment data is provided to each of the plurality of devices other than the first device to notify the users of the plurality of devices about the change to the content item.

8. The system of claim 7, wherein the content item is displayed for editing in a native application of the device and detecting the save operation comprises detecting a presence event on the device.

9. The system of claim 8, wherein displaying the user interface element comprises displaying a prompt element along a boundary or border of a window of the native application.

10. The system of claim 7, wherein the user interface element is displayed responsive to determining that the content item has changed.

11. The system of claim 7, wherein the metadata comprises version information about the content item.

12. A computer program product comprising a computer-readable storage medium containing computer program code configured to cause a processor to perform steps comprising:
  detecting, by a client application on a first device, a save operation on a content item synchronized between a content management system and a plurality of devices including the first device, each device associated with one of a plurality of users with which the content item is shared, and the save operation including a change to the content item;
  generating for display, by the client application in a user interface of the first device, a user interface element prompting a user of the first device to input comment data associated with the change to the content item, wherein the user interface element is displayed responsive to determining that the user should be prompted to comment based on the extent to which the content item has changed;
  receiving input comment data from the user; and
  sending the comment data and metadata related to the content item to the content management system, wherein the comment data is provided to each of the plurality of devices other than the first device to notify the users of the plurality of devices about the change to the content item.

13. The computer program product of claim 12, wherein the content item is displayed for editing in a native application of the device and detecting the save operation comprises detecting a presence event on the device.

14. The computer program product of claim 13, wherein displaying the user interface element comprises displaying a prompt element along a boundary or border of a window of the native application.

15. The computer program product of claim 12, wherein the user interface element is displayed responsive to determining that the content item has changed.

16. The computer program product of claim 12, wherein the metadata comprises version information about the content item.

17. The computer program product of claim 12, wherein the metadata comprises a timestamp for the save operation or the comment.

* * * * *